US009153398B2

(12) United States Patent
Hudson et al.

(10) Patent No.: US 9,153,398 B2
(45) Date of Patent: Oct. 6, 2015

(54) PORTABLE ACTUATOR ASSEMBLY

(75) Inventors: Simon Hudson, North Somerset (GB); Derek W. Jones, Galloway (GB)

(73) Assignee: Rockwell Automation Limited (GB)

( * ) Notice: Subject to any disclaimer, the term of this patent is extended or adjusted under 35 U.S.C. 154(b) by 1183 days.

(21) Appl. No.: 13/084,157

(22) Filed: Apr. 11, 2011

(65) Prior Publication Data

US 2011/0291775 A1 Dec. 1, 2011

(30) Foreign Application Priority Data

Jun. 1, 2010 (EP) .................................... 10251015

(51) Int. Cl.

| | |
|---|---|
| ***H02H 11/00*** | (2006.01) |
| ***H01H 9/02*** | (2006.01) |
| ***G04F 3/06*** | (2006.01) |
| ***H01H 27/00*** | (2006.01) |

(52) U.S. Cl.

CPC ........... *H01H 27/002* (2013.01); *H01H 9/0214* (2013.01)

(58) Field of Classification Search

CPC combination set(s) only.
See application file for complete search history.

(56) References Cited

U.S. PATENT DOCUMENTS

| | | | | |
|---|---|---|---|---|
| 7,429,708 | B1 * | 9/2008 | Poyner et al. | 200/43.04 |
| 2002/0113701 | A1 * | 8/2002 | Turk | 340/542 |
| 2004/0032043 | A1 * | 2/2004 | Woolford et al. | 264/71 |

* cited by examiner

*Primary Examiner* — Jared Fureman
*Assistant Examiner* — Aqeel Bukhari
(74) *Attorney, Agent, or Firm* — Boyle Fredrickson, S.C.

(57) ABSTRACT

A portable actuator and safety switch assembly wherein the portable actuator includes a housing and an actuator for selectively engaging with a control mechanism of said safety switch. The actuator is at least one of partially located within the housing, forms a part of the housing, or is attached to the housing. The assembly includes a controller that controls a configuration of the actuator assembly, such that the actuator assembly can selectively and controllably attain a first configuration wherein the actuator is able to interact with the control mechanism of the safety switch and a second configuration wherein the actuator is unable to manipulate the control mechanism of said safety switch.

14 Claims, 7 Drawing Sheets

PORTABLE ACTUATOR ASSEMBLY

CROSS REFERENCE TO RELATED APPLICATIONS

This application claims priority to European Patent Application No. 10251015 filed on Jun. 1, 2010 titled "PORTABLE ACTUATOR ASSEMBLY" and the disclosure of which is incorporated herein.

BACKGROUND

The present invention relates to a portable actuator assembly for use in the actuation of a control mechanism of a safety switch (which may generally be referred to as the actuation of the safety switch).

Safety switches are well known, and are typically used to prevent access to for example electromechanical machinery when that machinery is in operation. In a conventional arrangement the safety switch is mounted on a doorpost of a machinery guard, and an actuator for the safety switch is mounted on a corresponding door. When the door is closed the actuator engages with the safety switch, which in turn closes a set of electrical contacts which allow power to be supplied to the machinery. This arrangement ensures that power can only be supplied to the machinery when the guard door is shut. When the guard door is opened, the actuator disengages from (i.e. is withdrawn from) the safety switch, thereby opening the electrical contacts and cutting off the supply of power to the machinery.

A typical safety switch comprises a body, in which is provided a set of contacts fixed in position relative to the body. An axially slideable plunger is mounted inside the body, and is moveable relative to the body. The plunger (or another plunger in contact with the plunger, for example a contact block plunger) is provided with another set of contacts. The plunger is biased towards a cam arrangement or other control arrangement by a biasing element, such as a spring. The actuator mentioned above is arranged to engage with the cam arrangement.

In many safety switches, if the actuator is not engaged with the cam arrangement (e.g. if the actuator is not engaged with the safety switch), the cam arrangement is arranged to prevent the contacts on the plunger coming into contact with the contacts in the body of the switch by preventing movement of the plunger (i.e. the plunger is kept in a first plunger position). By preventing the contacts from contacting one another, the switch cannot conduct electricity while the actuator is not engaged with the cam arrangement.

Bringing the actuator into engagement with the cam arrangement causes the cam arrangement to rotate, which in turn causes the plunger (which is biased toward the cam arrangement) to move into a notch provided in the cam arrangement. The plunger is then in a second plunger position. When the plunger moves into the notch, the contacts on the plunger are brought into contact with the contacts of the body of the switch, allowing electricity to flow through the safety switch.

As discussed above, in a conventional arrangement, the safety switch is mounted on a door post of a machinery guard, and an actuator of the safety switch is mounted on a corresponding door of the machinery guard. However, it is also known to alternatively or additionally use one or more further actuators which are not mounted on the door but are instead provided in isolation. Such additional isolated actuators may be used for maintenance, testing, cleaning, or the like. For instance, in one example a manager or supervisor may be responsible for such an isolated actuator. An employee responsible for maintenance may approach the manager or supervisor to request permission to use the isolated actuator. The manager or supervisor may grant such permission, and provide the isolated actuator to the maintenance employee. The maintenance employee may then approach the safety switch, and engage the provided isolated actuator with a safety switch. It is important to note that this isolated actuator is not the actuator mounted to the door. Thus, the door to the machinery guard is not closed when the maintenance employee uses the additional isolated actuator. By using the isolated actuator, the employee may cause electricity to be supplied to machinery within the machinery guard without closing the door, allowing the maintenance employee to test, clean, maintain or the like the machinery when it is in operation, or at least when power is supplied to the machinery.

It is important to try to ensure that the provision of such an isolated actuator, and/or the use of such an isolated actuator, is not abused. For example, it is plausible that the isolated actuator may not be returned to the manager or supervisor, but instead may be used to allow anyone with the isolated actuator to enter the machinery guard while the machinery is operating. This can create a potentially unsafe condition, not only for the user of the isolated actuator, but for any other user or the like working in the vicinity of the machinery or machinery guard. It will be apparent that abuse of the use of such an isolated actuator is undesirable, and should be avoided and/or limited by imposing some sort of control. One way of achieving such control might involve the manager or supervisor requesting the return of the isolated actuator after its use. However, the manager or supervisor may forget to request the return of the actuator, or if a large number of isolated actuators are available, one or more isolated actuators may become easily misplaced. Alternatively or additionally, one or more users may obtain such an isolated actuator without permission of the manager or supervisor, making it difficult or impossible for the manager or supervisor to keep track of the isolated actuators, the location of the isolated actuators and the usage of the isolated actuators.

It is therefore desired to provide an improved or alternative portable actuator assembly which may overcome or substantially mitigate at least one disadvantage of the prior art, whether identified herein or elsewhere, associated with the use of isolated actuators.

SUMMARY OF THE INVENTION

According to an aspect of the present invention, there is provided a portable actuator assembly for use in the actuation of a control mechanism of a safety switch, the actuator assembly comprising: a housing; an actuator for engaging with said control mechanism of said safety switch, the actuator being at least partially located within the housing, or forming a part of the housing, or being attached to the housing; and a controller for controlling a configuration of the actuator assembly, such that the actuator assembly is (e.g. selectively and controllably) in a first configuration or in a second configuration, the controller being at least partially located within the housing, or forming a part of the housing, or being attached to the housing; the first configuration being when the actuator is able to engage with said control mechanism of said safety switch; and the second configuration being when the actuator is unable to engage with said control mechanism of said safety switch.

Once in the second configuration, the actuator assembly may not be changeable to the first configuration until an external input has been received by and/or provided to the controller (e.g. a reset input, or new criteria for effecting a change from the first configuration to the second configuration, or the like).

The controller may comprise, or be in connection with, a timing arrangement, a change from the first configuration to the second configuration being dependent on a timing.

The timing arrangement may comprise a timer for determining a time period.

The actuator assembly may be arranged to change from the first configuration to the second configuration when the time period has elapsed.

The timing arrangement may comprise a detector for determining a number of attempts of use of the actuator in the actuation of said control mechanism of said safety switch.

The actuator assembly may be arranged to change from the first configuration to the second configuration when the number of attempts reaches a threshold number.

The controller may be arranged to: move the actuator from a first position in the first configuration to a second position in the second configuration; and/or shield the actuator in the second configuration and unshield the actuator in the first configuration; and/or enable the actuator in the first configuration, and disable the actuator in the second configuration.

The actuator may comprise a tongue which is arranged to extend from the housing when in the first configuration, and to be substantially retracted within the housing when in the second configuration.

The actuator may comprise a magnet which is arranged to be in a first position, within a detection range of a magnetic switch of said control mechanism of said safety switch, when in the first configuration, and to be moveable within the housing to a second position, outside of a detection range of said magnetic switch of said control mechanism of said safety switch, when in the second configuration.

The actuator may comprise a transmitter which is arranged to be in a first position, within a detection range of a receiver of said control mechanism of said safety switch, when in the first configuration, and to be moveable within the housing to a second position, outside of a detection range of said receiver of said control mechanism of said safety switch, when in the second configuration.

The actuator may comprises: a magnet which is arranged to be unshielded when in the first configuration, thereby allowing the magnet to be detected by a magnetic switch of said control mechanism of said safety switch, and shielded when in the second configuration thereby preventing such detection; and/or a transmitter which is arranged to be unshielded when in the first configuration, thereby allowing a transmission from the transmitter to be received by a receiver of said control mechanism of said safety switch, and shielded when in the second configuration thereby preventing such transmission and/or reception.

The portable actuator assembly may further comprise a moveable shield. Alternatively, a shield may be stationary, and the actuator moved relative to that shield.

The actuator may comprise a transmitter which is controllable to transmit a signal to a receiver of said control mechanism of said safety switch, when in the first configuration, and to transmit a different signal, or to prevent such transmission, when in the second configuration.

The transmitter may be controllable to be enabled in the first configuration, and disabled in the second configuration.

The controller may comprise, or be in connection with, a driver (e.g. comprising a motor or the like) for moving the actuator and/or for moving a shield.

The controller may comprise or be in connection with a connector for connection (of the controller, e.g. forming part of or being located within the housing) to an external controller, located outside of the actuator assembly and/or housing. The connector may facilitate contact or non-contact connection (e.g. wired or wireless).

The controller may comprise or be in connection with, a power supply.

The portable actuator assembly may be a substantially hand-held or hand-holdable portable actuator assembly.

DETAILED DESCRIPTION OF THE PREFERRED EMBODIMENTS

Figure 1:
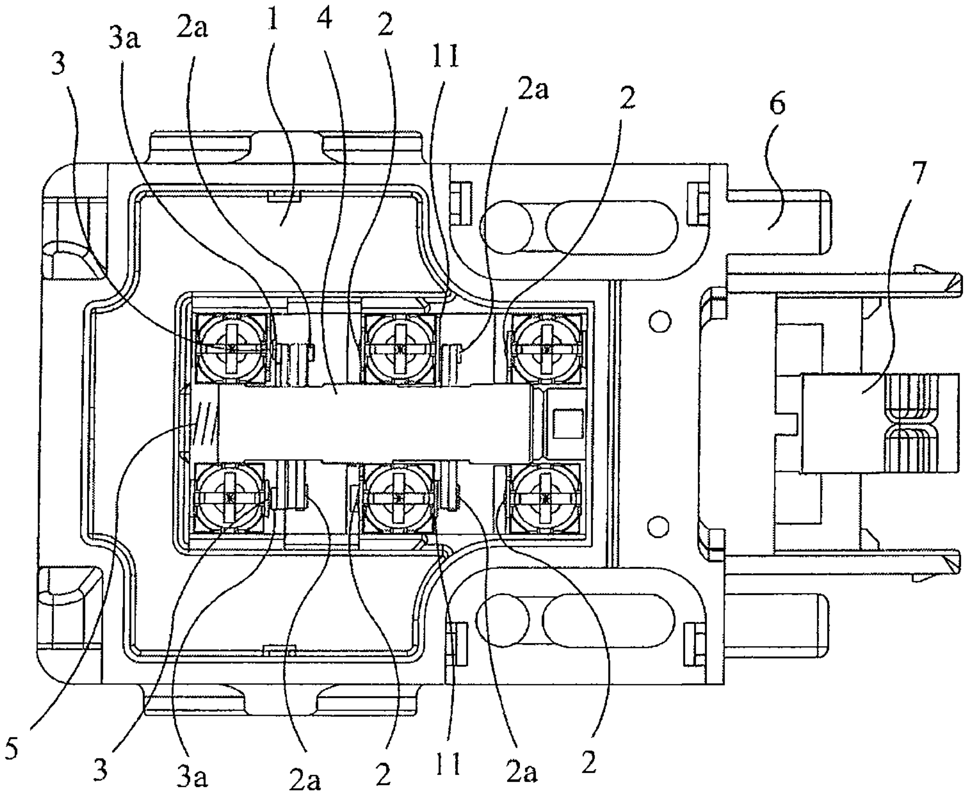
FIG. 1 schematically depicts a safety switch in accordance with an embodiment of the present invention.

FIG. 1 depicts a plan view of a safety switch in accordance with an embodiment of the present invention. The safety switch comprises of two parts. One part of the safety switch comprises a main body 1 of the safety switch. Mounted within the body 1 are electrical contacts which are fixed in position relative to the body 1. These fixed contacts may be described as a contact block. The contact block may be removable from the body 1.

In this embodiment, the contacts consist of two pairs (i.e. two sets of two) safety contacts 2 and a fixed pair of auxiliary contacts 3. Also mounted within the body 1 is a contact block plunger 4 which is slideable relative to the body 1 in an axial direction. In this embodiment, the contact block plunger 4 is provided with bridge contacts 2*a*, 3*a*, which extend through the contact block plunger 4 and which in this embodiment are moveable relative to the contact block plunger 4 (e.g. to allow for greater tolerance in the movement of the contact block plunger 4). The moveable contacts 2*a*, 3*a* comprise two independently moveable safety bridge contacts 2*a* and an auxiliary bridge contact 3*a*. By moving the contact block plunger 4, the moveable contacts 2*a*, 3*a* can be brought into contact (and thus electrical connection) with the fixed contacts 2, 3 of the safety switch. The contact block plunger 4 is also provided with a moveable insulating barrier 11 which serves to provide additional electrical insulation for some of the moveable safety contacts 2*a*.

The contact block plunger 4 is biased by a spring 5 (or other suitable biasing element) towards a second part of the safety switch, which is a head 6 of the safety switch. The head 6 of the safety switch may be detachable from and/or rotatable relative to the body 1. In another example (not shown) the head 6 and body 1 may be integrally formed. In this example, the body 1 is larger in size than the head 6. However, in other examples, the body 1 may be smaller in size than the head 6. The terms 'head' and 'body' may be used to distinguish between different parts, sections, volumes, regions, or the like, of the safety switch.

Figure 2:
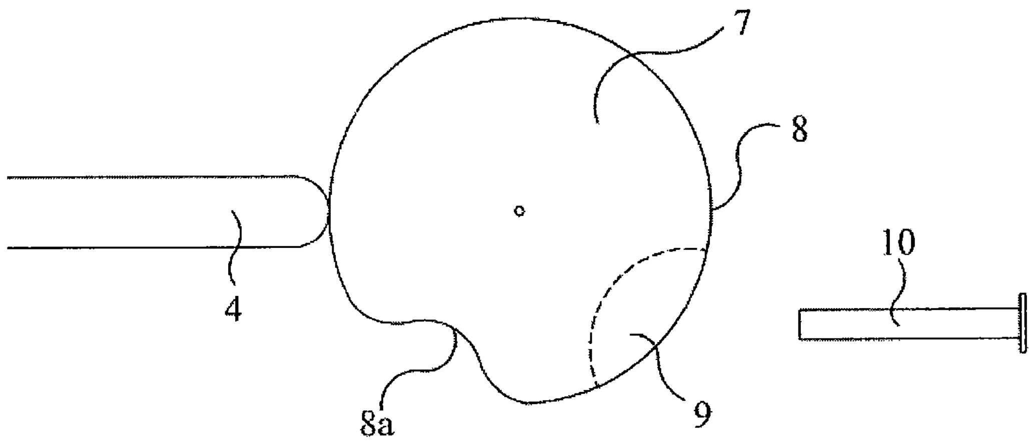
FIGS. 2 and 3 schematically depict a cam arrangement of the safety switch of FIG. 1.
Figure 3:
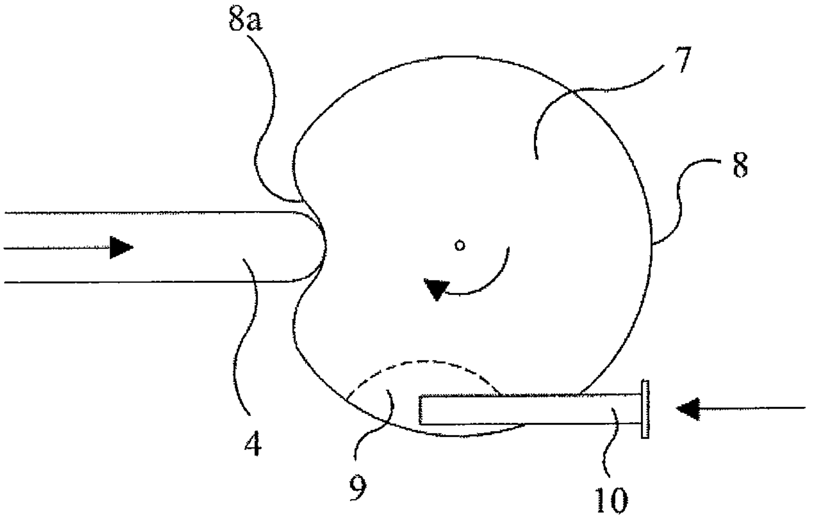

The head 6 of the safety switch is provided with a rotatable cam arrangement 7. The cam arrangement 7 is arranged to receive and engage with an actuator (FIGS. 2 and 3). Engagement or disengagement of the actuator with the cam arrangement 7 causes the cam arrangement 7 to rotate, which in turn causes axial movement of the contact block plunger 4 within the body 1 of the safety switch.

Usually, the head of the safety switch is not sealed or is not sealable. Water or dirt or the like may, for example, enter the head of the safety switch (e.g. via apertures for insertion of an actuator) and come into contact with the cam arrangement. Usually, the body is sealed or is sealable. Water or dirt or the like may not, for example, enter the body of the safety switch. This may be advantageous, for example to protect the electrically conductive parts of the contact block and prevent damage to the contact block and/or the safety switch as a whole.

FIGS. 2 and 3 illustrate an interaction between the cam arrangement 7 and the contact block plunger 4. FIG. 2 shows that the cam arrangement 7 defines a cam surface 8. The cam surface 8 is provided with or forms an indentation 8*a* which is (upon rotation of the cam arrangement 7) arranged to receive an end of the contact block plunger 4. The cam arrangement 7 is also provided with a notch 9 for receiving and engaging with an actuator 10 (e.g. being or comprising a tongue). It can be seen from FIG. 2 that when no actuator is brought into engagement with the cam arrangement 7, the cam arrangement pushes back against or resists the contact block plunger 4 (which is biased toward the cam arrangement 7 by a spring) and prevents the contact block plunger 4 from moving any further towards the center of the cam arrangement 7. The contact block plunger 4 is said to be in a first contact block plunger position.

FIG. 1 (in combination with FIG. 2) shows that when no actuator is brought into engagement with the cam arrangement 7, all of the fixed safety contacts 2 of the body 1 of the safety switch are kept apart from all of the moveable safety bridge contacts 2*a* of the contact block plunger 4. Thus, when no actuator is engaged with the cam arrangement 7, the safety contacts 2, 2*a* are not in electrical connection with each other, which prevents the safety switch from conducting electricity (to, for example, electrically powered machinery within a machine guard). In this embodiment, when no actuator is engaged, the auxiliary contacts 3, 3*a* are in contact with each other, which may allow an auxiliary power supply to be supplied to the switch (for example, to power a light which indicates that no actuator has been engaged with the switch).

FIG. 3 depicts an actuator 10 that has been brought into engagement with the cam arrangement 7. It can be seen from FIG. 3 that when the actuator 10 has been brought into engagement with the cam arrangement 7, the cam arrangement 7 and therefore cam surface 8 are arranged to rotate in a clockwise direction. Rotation of the cam arrangement 7 causes the indentation 8*a* in the cam surface 8 to be brought into alignment with an end of the contact block plunger 4. As the indentation 8*a* moves into alignment with the end of the contact block plunger 4 (which is biased by a spring) the contact block plunger 4 moves towards the right of FIG. 3. The contact block plunger 4 is said to be in a second contact block plunger position.

Figure 4:
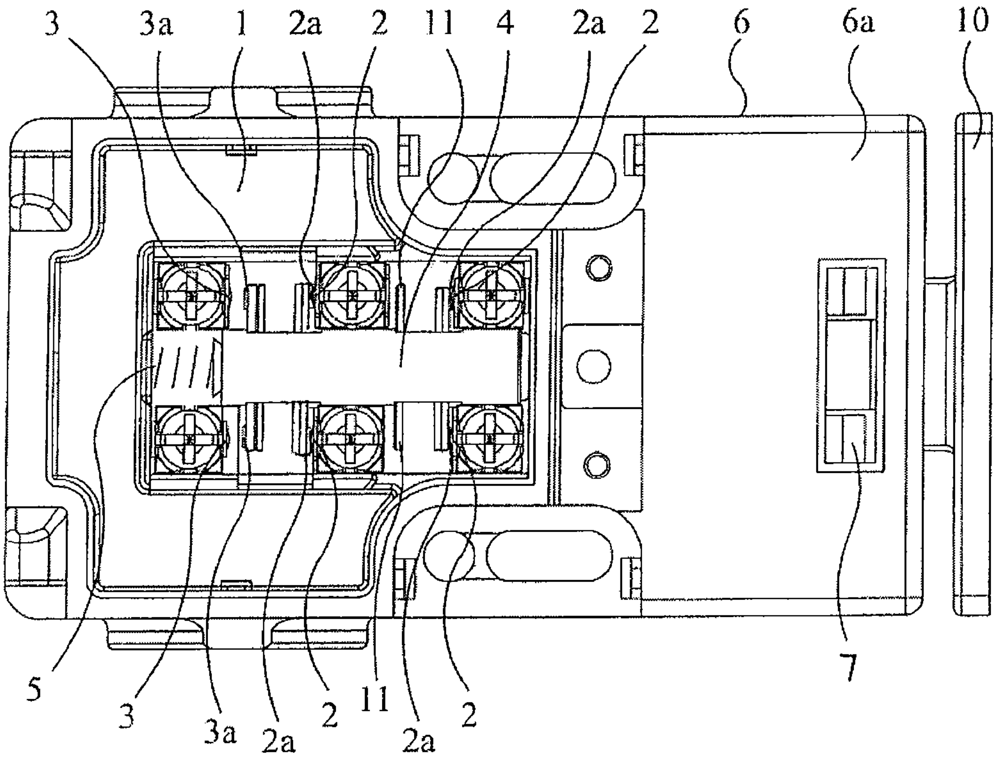
FIG. 4 schematically depicts operating principles of the safety switch of FIG. 1.

FIG. 4 shows the safety switch of FIG. 1, but now with an end cap 6*a* enclosing the head 6 of the safety switch. The end cap 6*a* protects the cam arrangement 7 from damage, and may make the safety switch more aesthetically pleasing. FIG. 4 shows the safety switch when an actuator 10 has been engaged with the switch.

FIG. 4 shows that when the actuator 10 is brought into engagement with the cam arrangement 7, the contact block plunger 4 moves towards the right of FIG. 4. When the contact block plunger 4 moves to the right, all of the moveable safety bridge contacts 2*a* are brought into electrical connection with the fixed safety contacts 2 of the body 1 of the safety switch. When all of the safety contacts 2, 2*a* are brought into electrical connection with each other, the switch is capable of conducting electricity (to, for example, electrically powered machinery within a machine guard).

As already discussed above, actuators for use in engaging with a safety switch may be provided, or obtained, in isolation—i.e. not necessarily attached to a door or the like. The unrestricted, uncontrolled or unlimited use of such isolated actuators may defeat the purpose of the safety switch, and it is therefore desirable to introduce some form of control relating to the use of such isolated actuators. Such control might involve obtaining the permission or the like of one or more managers or supervisors. However, this does not provide a solution to the problem when the manager or supervisor is unaware of the presence of additional isolated actuators, or is unaware of the absence of isolated actuators for which the manager or supervisor is responsible.

According to an embodiment of the present invention, one or more problems of the prior art, whether identified herein or elsewhere, may be overcome. According to an embodiment of the present invention, there is provided a portable actuator assembly for use in the actuation of a control mechanism of a safety switch (which may be referred to more generally as a portable actuator assembly for use in the actuation of a safety switch). The actuator assembly comprises a housing. At least partially located within that housing, or forming part of the housing, or being attached to the housing, is an actuator for engaging with the control mechanism of the safety switch (e.g. in a contact or non-contact manner). A controller is also provided, for controlling a configuration of the actuator assembly, such that the actuator assembly is (e.g. selectively and controllably) in a first configuration or in a second configuration. The controller is also at least partially located within the housing, forms part of the housing, or is attached to the housing. When the actuator of the assembly is able to engage with and actuate (e.g. change the state of) the control mechanism of the safety switch, the actuator assembly is in the first configuration. When the actuator of the assembly is unable to engage with and actuate the control mechanism of the safety switch, the actuator assembly is in the second configuration.

Because the controller of the actuator assembly controls the configuration of the assembly, the control is self contained and does not need to rely on continuous input from a manager or supervisor, or the locking away of the actuator assembly. For instance, the controller may be programmed or prompted to ensure that the actuator is only able to engage with the control mechanism of the safety switch (i.e. is in the first configuration) for a pre-determined period of time, or for a pre-determined number of attempts (successful or unsuccessful) at using the actuator assembly to engage with an actuated safety switch.

Preferably, once the controller has ensured that the configuration of the assembly has changed from the first configuration to the second configuration, the assembly may not be changeable back to the first configuration without the provision of an external input to the controller. Such an external input may be provided by a connector forming part of or being in connection with the controller. The input may be provided, for example, by a computer or docking station or the like located in a controlled environment, for example a manager's office or supervisor's office. Without such external input, it may not be possible to use the actuator assembly to actuate the control mechanism of a safety switch, further adding to the safety and benefits of the use of the portable actuator assembly according to an embodiment of the present invention.

Because the actuator assembly is portable, it may be used, stored and the liked in much the same way as the isolated actuators discussed previously. 'Portable' may be defined as not being attached to, or not being designed to be attached to, a fixed structure such as a door, door post, fence, or fence post, or the like. 'Portable' may alternatively or additionally be defined by the size of the assembly, and for example might be defined by the assembly being hand-held or hand-holdable. 'Portable' may alternatively or additionally be defined as the assembly not being attached to a safety switch, e.g. by a connecting cable or the like. 'Portable' thus distinguishes the present invention from enabling switches, which are hand-held switches that are attached to a safety switch by a connecting cable, wire, line or the like. A further distinguishing feature is that the assembly of the present invention comprises the actuator, whereas an enabling switch might be in connection with an actuator already attached to or forming a part of the safety switch.

Embodiments of the present invention will now be described, by way of example only, with reference to FIGS. 5-12. Features appearing in the Figures have not been drawn to any particular scale.

Figure 5:
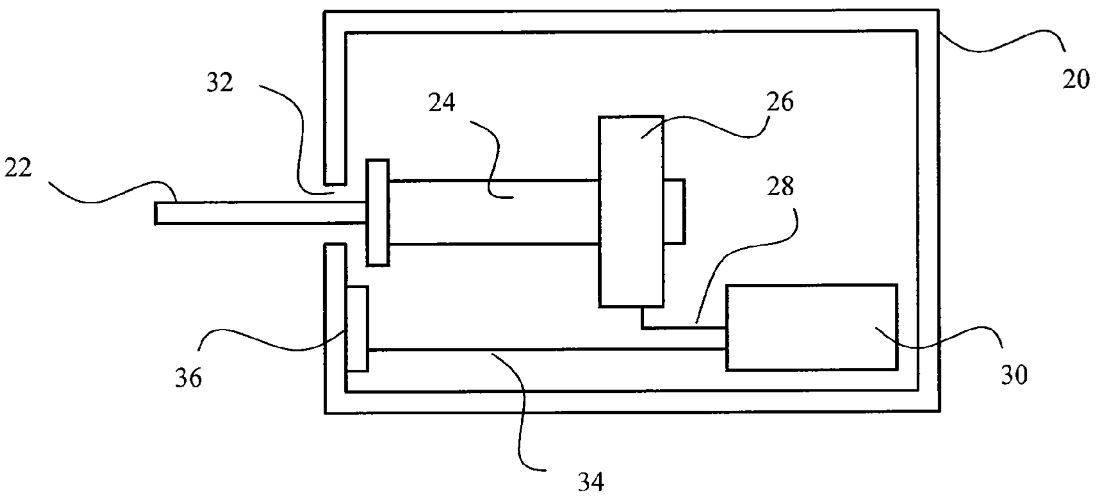
FIG. 5 schematically depicts a portable actuator assembly in accordance with a first embodiment of the present invention, in a first configuration.

FIG. 5 schematically depicts a portable actuator assembly for use in the actuation of a control mechanism of a safety switch (FIG. 1), in accordance with a first embodiment of the present invention. The actuator assembly comprises a housing 20, which may be made from metal, plastic, or any other suitable material. The actuator assembly is further provided with an actuator 22. In this embodiment, the actuator comprises or forms a physical tongue which may be used, for example, to engage with a cam arrangement or the like of a safety switch. The actuator 22 is connected, possibly by way of a connector 24, to a driver 26. With appropriate control, the driver 26 is arranged to move the actuator 22. The driver 26 may be or comprise a motor, a linear actuator, or any other arrangement capable of moving the selectively moving the actuator 22. The driver 26 is connected 28 to a controller 30, also located within the housing 20.

The controller 30 is arranged to control a configuration of the actuator assembly as a whole, such that the actuator assembly is selectively and controllably changeable between a first configuration (as shown in FIG. 5) and a second configuration (as shown in, and as will be described with reference to, FIG. 6). The controller 30 comprises (or in other embodiments, is in connection with) a power supply for supplying power to the controller 30 and/or any other one or more components of the actuator assembly. The power supply can be any convenient power supply, for example a capacitor, or a battery, or the like.

As discussed above, the controller 30 is arranged to control the configuration of the actuator assembly such that the actuator assembly is in a first configuration or a second configuration. FIG. 5 shows the portable actuator assembly in a first configuration, where the actuator 22 is able to engage with a control mechanism of a safety switch (as shown and described by example with reference to FIG. 1). In this embodiment, the actuator 22 is able to engage with a control mechanism of a safety switch because the actuator 22 protrudes from an aperture 32 of the housing 20.

If the actuator 22 was permanently protruding from the housing 20, the portable actuator assembly would, in functional terms, be no different from the isolated actuators discussed above in relation to the prior art. However, and in contrast with the prior art, in accordance with an embodiment of the present invention the actuator 22 is movable, and specifically retractable into the housing 20 by appropriate control of the driver 26 by the controller 30. By withdrawing the actuator 22 into the housing 20, the actuator 22 and thus the actuator assembly as a whole cannot then be used to engage with and actuate a control mechanism of a safety switch. A degree of control of the use of the actuator assembly is achieved, without the input of a manager or the like.

Figure 6:
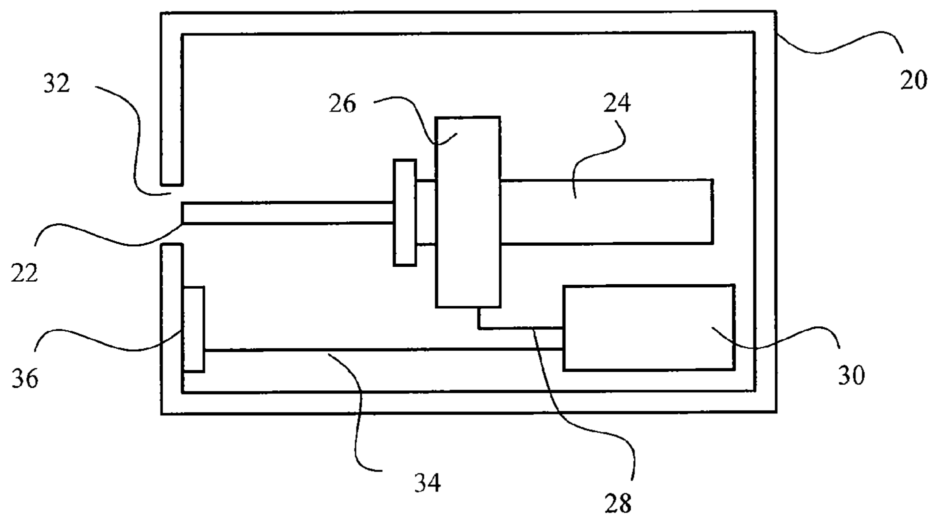
FIG. 6 schematically depicts the portable actuator assembly of FIG. 5, in a second configuration.

The second configuration of the actuator assembly is shown in FIG. 6.

Referring to FIGS. 5 and 6 in combination, a change from the first configuration shown in FIG. 5 to the second configuration shown in FIG. 6 may be achieved in one of a number of different ways. In a preferred example, the controller 30 is provided with (or in other embodiments, in connection with) a timing arrangement (e.g. being or comprising a clock, a counter or a countdown timer). The change from the first configuration to the second configuration may be dependent on a timing associated with (e.g. measured or determined by) the timing arrangement. In one example, the timing arrangement may comprise a timer for determining a time period (which includes an elapsed time period). The actuator assembly may change from the first configuration to the second configuration when this time period has elapsed. For instance, the time period may be set by a manager or supervisor, such that a user of the portable actuator assembly only has a predetermined and pre-set limited period of time during which the actuator assembly may be used to actuate a control mechanism of a safety switch. After this period of time, the controller 30 changes the actuator assembly to the second configuration, after which actuation of the safety switch using the assembly is not possible without moving the actuator assembly as a whole back to the first configuration. Moving back to the first configuration may only be achieved by, for example, an appropriate external input provided to the controller 30. Such an external input may be provided via a connector constituting a part of, or being in connection with, the controller 30. The connector may facilitate contact, or non-contact communication, for example wired or wireless communication. The connection may be made with an external controller, such as for example a controller which forms a part of a docking station or computer or the like that is monitored, or controlled by the manager or supervisor or the like.

A different, but related, variation on the timing arrangement is possible. Such a variation may (instead of using a time period, or an elapsed time period) involve determining (by appropriate detection) a number of attempts of use of the actuator assembly in the actuation of a control mechanism of a safety switch. Once the number of attempts has reached a threshold number (e.g. a pre-set number), the actuator assembly is moved from the first configuration to the second configuration by the controller 30. The controller 30 may comprise or be in connection 34 with a detector 36 for use in determining (e.g. detecting) a number of attempts of the use of the actuator assembly in the actuation of a control mechanism of a safety switch. The detector 36 may take one of a number of different forms. For instance the detector 36 may be or comprise a reed switch. The safety switch that is to be actuated by the actuator assembly may comprise or be provided with an appropriately located magnet that is in proximity with the reed switch of the detector 36 when the actuator assembly is brought into proximity with the safety switch for actuation of that safety switch. Each time the reed switch is opened or closed, a counter of the timing arrangement can be incremented. Alternatively, the detector 36 might be an optical detector, configured to read a code or the like provided on the safety switch. Again, each time the code is read, a counter of the timing arrangement can be incremented.

The controller 30 may be programmed to move the assembly to second configuration after a predetermined time, regardless of any other criteria, as a default safety measure. For example, if the actuator assembly has only been used three times, and a threshold of five times has been set before the assembly is moved to the second configuration, the assembly might be moved to the second configuration after that pre-determined time even though the threshold (for use of the assembly) has not been reached.

The actuator assembly as a whole may have a shape and/or size which results in the actuator assembly being a hand-held actuator assembly, or a hand-holdable actuator assembly. This facilitates easy transport, storage and use of the actuator assembly.

The first embodiment of the invention shown in and described with reference to FIGS. 5 and 6 has depicted and described an actuator comprising or forming a tongue which may be used to physically engage with and interact with a control mechanism of a safety switch (for example, a cam arrangement of a safety switch). Some safety switches may be provided with a control mechanism that is actuated in a non-contact manner, and which does not require the engagement of a mechanical actuator, for instance the actuator provided with a tongue as described above. For such safety switches, the portable actuator assembly as shown in and described with reference to FIGS. 5 and 6 may be inappropriate, impractical, and simply may not function as intended. Portable actuator assemblies are therefore required to meet and match the requirements of specific different control mechanisms of specific different safety switches. Different embodiments of portable actuator assemblies which embody some of these requirements will now be described with reference to FIGS. 7-12.

In FIGS. 7-12, one, most, or all of the general operating principles as shown in and described with reference to FIGS. 5 and 6 may be applicable. For instance the changing of the actuator assembly from a first configuration to a second configuration by the controller is applicable, which may be dependent on a timing (e.g. an elapsed time, or a number of attempts of use of the actuator assembly to actuate a safety switch).

Figure 7:
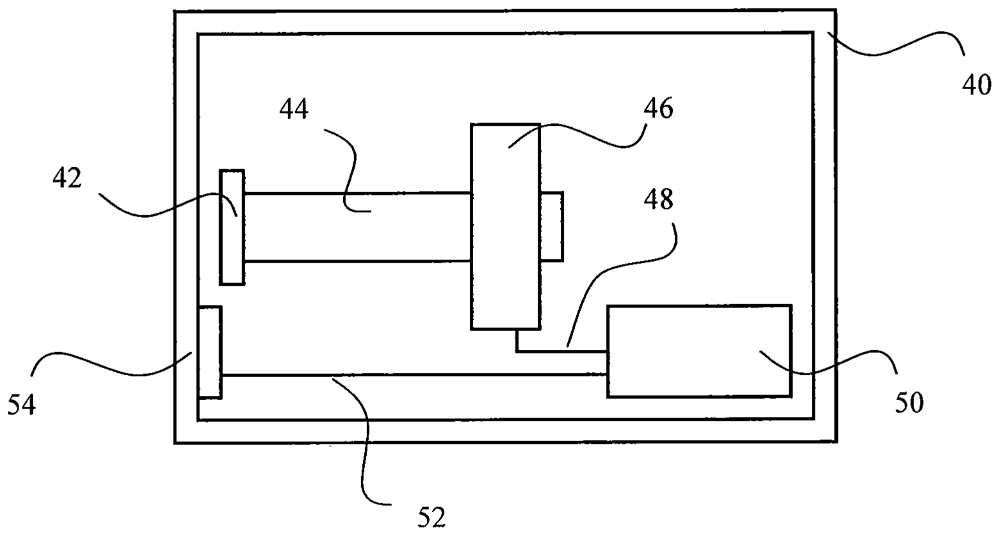
FIG. 7 schematically depicts a portable actuator assembly in accordance with a second embodiment of the present invention, in a first configuration.

FIG. 7 schematically depicts a portable actuator assembly in accordance with a second embodiment of the present invention, in a first configuration. The actuator assembly comprises a housing 40. Located within the housing 40 is a non-contact actuator 42 (e.g. a magnet or a transmitter) connected by way of a connector 44 to a driver 46. The driver 46 is in connection 48 with a controller 50. The controller 50 may be in connection 52 with a detector 54, as described above.

When in the first configuration as shown in FIG. 7, the actuator 42 (if comprising a magnet) is arranged to be within a detection range of a magnetic switch of a control mechanism of a safety switch, when the actuator assembly as a whole is brought into an actuating position or configuration with a safety switch. Similarly, if the actuator 42 comprises a transmitter, the transmitter 42 in the first configuration may be within a detection range of a receiver or detection mechanism of such a safety switch.

Figure 8:
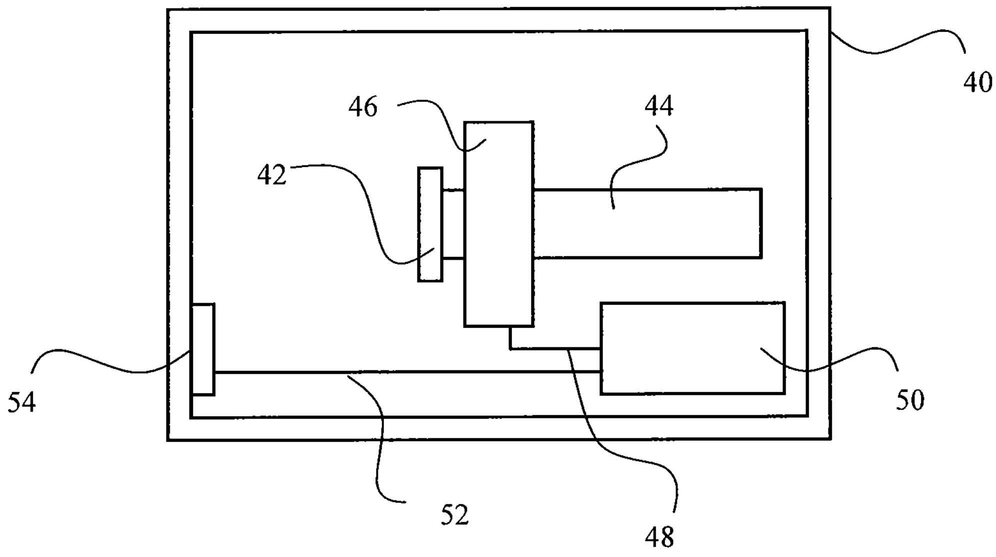
FIG. 8 schematically depicts the portable actuator assembly of FIG. 7, in a second configuration.

FIG. 8 shows the actuator assembly in a second configuration. In the second configuration, the controller 50 has controlled the driver 46 to move the actuator 42 further into (e.g. towards the centre of) the housing 40. The actuator 42 is moved to such an extent to prevent detection of a magnetic field of a magnet of the actuator 42, or of a signal transmitted by a transmitter of the actuator 42, when the actuator assembly as a whole is in an actuating configuration or position in relation to a safety switch. Thus, in the second configuration, actuation of the safety switch is not possible.

If the actuator 42 is a transmitter, the transmitter could be a powered transmitter, or a passive transmitter, such as an RFID, tag or the like. A magnet may be a permanent magnet, or an electromagnet.

Figure 9:
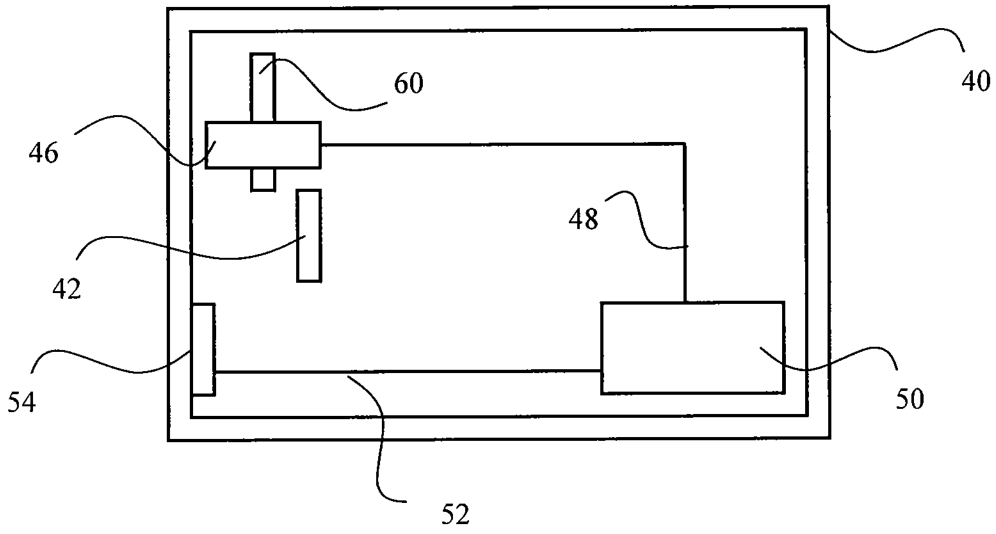
FIG. 9 schematically depicts a portable actuator assembly in accordance with a third embodiment of the present invention, in a first configuration.

FIG. 9 schematically depicts an actuator assembly according to a third embodiment of the present invention, in a first configuration. Many of the features shown in FIG. 9 are similar to, or identical to, features shown in and described with reference to FIG. 7, and therefore like features have been given the same reference numerals. A subtle but important difference between the embodiments shown in FIGS. 7 and 9 is that in FIG. 9, the actuator 42 (which is again a non-contact actuator such as being or comprising a magnet or transmitter) is not necessarily movable. Instead, the actuator assembly in FIG. 9 comprises a movable shield 60, which is controllably and selectively movable by the driver 46, controlled by the controller 50. In FIG. 9, the actuator 42 is unshielded.

Figure 10:
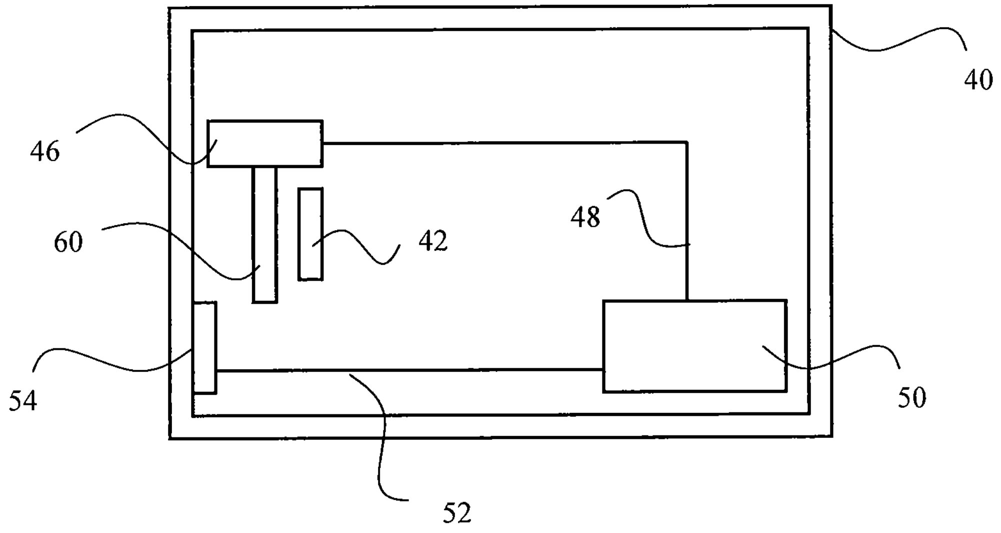
FIG. 10 schematically depicts the portable actuator assembly of FIG. 9, in a second configuration.

FIG. 10 shows the actuator assembly in a second configuration where the shield 60 has been moved by the driver 46 and controller 50 to shield the actuator 42. The shielding prevents detection of a magnetic field of the actuator 42 (if the actuator 42 comprises a magnet) or the detection of a signal transmitted by the actuator 42 (if the actuator 42 is or comprises a transmitter) by a corresponding magnetic switch, or receiver, of a safety switch. Thus, in the second configuration, the actuator assembly cannot engage with and actuate a safety switch.

Alternatively, actuator 42 might itself be movable behind a stationary or movable shield, to achieve much the same effect as shown in FIGS. 9 and 10.

Figure 11:
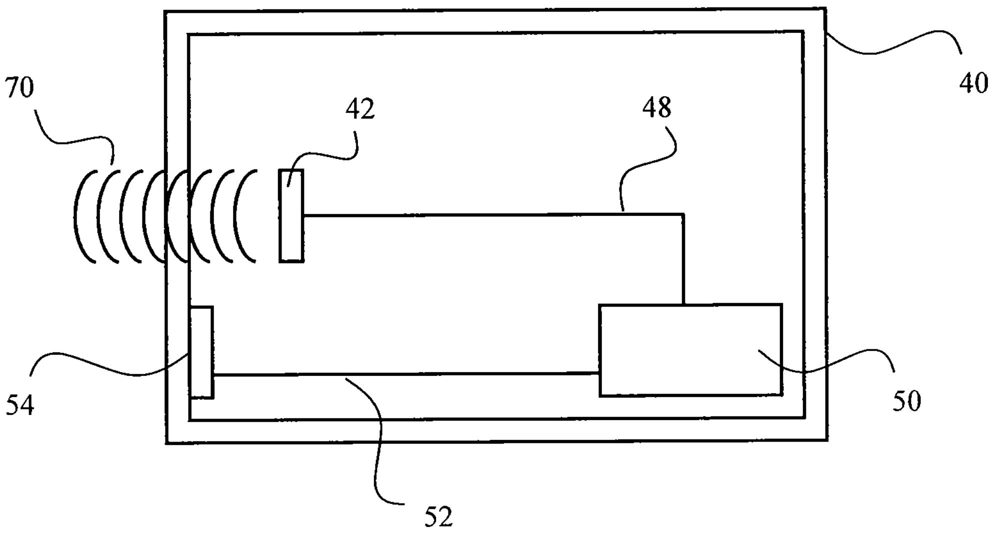
FIG. 11 schematically depicts a portable actuator assembly in accordance with a fourth embodiment of the present invention, in a first configuration.

FIG. 11 schematically depicts a portable actuator assembly in accordance with a fourth embodiment of the present invention, in a first configuration. The portable actuator assembly shares many of the features that were shown in and described with reference to FIGS. 7-10, and so those features have been given the same reference numerals in FIG. 11 (and FIG. 12) for clarity and consistency.

In the portable actuator assembly of FIG. 11, the actuator 42 is again a non-contact actuator. The actuator assembly as a whole may be used to engage with an actuator safety switch by bringing the actuator assembly into suitable proximity with a control mechanism of that safety switch. The non-contact actuator 42 transmits a signal 70 which may be detected by a detector of the safety switch (e.g. a receiver or magnetic switch or the like), which facilitates actuation of the safety switch.

The non-contact actuator 42 may be, for example, a transmitter, controllable by appropriate connection 48 to the controller 50. The transmitter may take any appropriate form, and may be a form of antennae or the like, or an electromagnetic, or an RFID tag, or the like.

Figure 12:
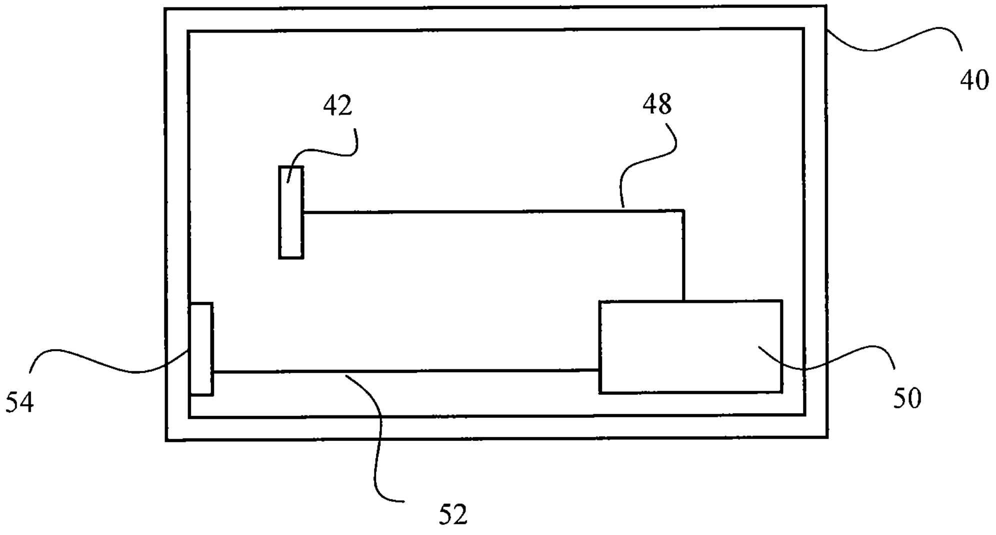
FIG. 12 schematically depicts the portable actuator assembly of FIG. 11, in a second configuration.

FIG. 12 shows the actuator assembly in a second configuration, where the actuator assembly cannot engage with and actuate a safety switch. In FIG. 12, the controller 50 has prevented the actuator 42 from transmitting a signal. This may be achieved by, for example, appropriately disabling the actuator 42. Alternatively, the controller 50 may control the actuator 42 to cause transmission of a different signal in a second configuration. The different signal may have a reduced intensity, so as to be undetectable by a detector in the safety switch. In another example, the signal may be different in the second configuration, and different to such an extent that the detector within the safety switch does not recognise the signal and thus does not actuate the safety switch, or recognises the signal as a signal which indicates that actuation of the safety switch should not be possible.

In any embodiment where the actuator operates in a non-contact manner (e.g. by transmitting a signal and/or generating a magnetic field), a unique 'code' may be assigned to the actuator assembly. For example, a transmitter forming a part of the actuator may transmit a signal, and this signal might be different (e.g. unique) for different actuator assemblies—the different actuator assemblies have different codes. A magnetic actuator might have a certain, coded, oscillation frequency. The code may be such that an actuator assembly can actuate all safety switches, for example all switches in a given area or a given plant or factory. Alternatively, the code may be such that an actuator assembly can only actuate a particular sub-set of the safety switches (including only a single switch), for example a switch for a particular machine guard that a user is qualified to operate, maintain, or the like. The codes may be changeable, for example by a manager or supervisor and/or by apparatus that may connect with the actuator assembly. For example, the manager may take a generic actuator assembly and, via a computer or docking station connecting with the assembly, assign a particular code to the assembly. That code may be such that the assembly may only actuate a particular or number of switches which a subsequent user has required access to. It will be appreciated that detectors and/or receivers located within, or in connection with, each switch may have a store of such codes that permit actuation of the switch.

It will be appreciated that one or more of the above embodiments may be combined. For instance, an actuator comprising a transmitter may be selectively enabled by a controller, as well as, or in combination with, being movable into and out of a detection range by a detector in the safety switch. Shielding may also be employed.

In the embodiments described above, a plurality of safety contacts has been described. However, it will be appreciated that any suitable configuration of safety contacts (and even auxiliary contacts) may be employed. For example, a contact block plunger may be provided with only a single safety bridge contact, and not two as shown in the Figures.

In some embodiments (e.g. those shown in the Figures) a plunger provided with contacts extending through the plunger may be located in a contact block or the like. The plunger in the contact block may be biased against a surface of the cam arrangement. Alternatively, the plunger in the contact block may be biased against an intermediate plunger (referred to as a switch plunger, to distinguish from the contact block plunger) located substantially outside of the contact block. The switch plunger may be biased against the cam arrangement by the contact block plunger.

It will be understood by the skilled person that a contact is a conductor which may be shaped at each of its ends, i.e. to define contact points. In the above described embodiments, the moveable safety and auxiliary contacts are conductors which extend transversely through the plunger, and protrude from both sides of the plunger (i.e. they are bridging contacts). The fixed contacts are conductors fixed in position relative to the body of the safety switch (which body may be, comprise, or form part of the body or head of the safety switch).

The plunger of the present invention has been described in relation to a safety switch having a fixed set of contacts located and fixed in position in the body of the safety switch. The fixed contacts form a contact block. The safety switch contact block is a structure that is provided with the fixed contacts (or conductors). The safety switch contact block as a whole is fixed in position into the body. The fixed contacts may thus be formed integrally with the body, individually fixed in position in the body, or form part of a contact block which is itself fixed in position in the body. The contact block may be removable and/or replaceable.

In the foregoing description, the safety switch has been described as having a cam arrangement and plunger co-operable with the cam arrangement. However, other control mechanisms may be used to control movement of the contact block plunger upon engagement or withdrawal of an actuator. For example, rather than being rotary in terms of motion, another (different) control mechanism might comprise a slideable or pivotable element or the like for control movement of the contact block plunger.

In the foregoing description, the making or breaking, or opening or closing, of contacts has been described as having the effect of allowing or preventing the safety switch from conducting electricity to electrically powered machinery to which the safety switch is connected. However, opening or closing of the contacts may have the more general effect of changing the operating state of the machinery, for example to a safe state, or slowing the machinery down, or stopping its movement while still maintaining its power supply. The changing of the operating state may be controlled directly by the safety switch (e.g. power supplied or not supplied) or by a controller in connection with the safety switch and the machinery. The opening or closing of contacts in the safety switch may be used by the controller to determine the control that is required to alter the operating state of the machinery. Such control may involve, alternatively or additionally to the use of contacts, different switching arrangements. For example, solid state switches may be used in place of or as well as contacts that are physically brought into and out of contact with one another.

It will be appreciated by a person skilled in the art that the invention is not limited to the embodiments described above, and that various modifications may be made to those embodiments, and other embodiments not described herein, without departing from the invention, which is defined by the claims which follow.

The invention claimed is:

1. A portable actuator assembly for use in the actuation of a control mechanism of a safety switch, the actuator assembly comprising:

a housing;

an actuator for engaging with said control mechanism of said safety switch, the actuator being at least partially located within the housing, or forming a part of the housing, or being attached to the housing; and a controller for controlling a configuration of the actuator assembly, such that the actuator assembly is in a first configuration or in a second configuration, the controller being at least partially located within the housing, or forming a part of the housing, or being attached to the housing;

the first configuration being when the actuator is able to engage with said control mechanism of said safety switch;

the second configuration being when the actuator is unable to engage with said control mechanism of said safety switch;

wherein the controller comprises, or is in connection with, a timing arrangement, a change from the first configuration to the second configuration being dependent on a timing;

wherein the timing arrangement comprises a detector for determining a number of attempts of use of the actuator in the actuation of said control mechanism of said safety switch; and wherein the actuator assembly is arranged to change from the first configuration to the second configuration when the number of attempts reaches a threshold number.

2. The portable actuator assembly of claim 1, wherein once in the second configuration, the actuator assembly is not changeable to the first configuration until an external input is received by the controller.

3. The portable actuator assembly of claim 1, wherein the timing arrangement comprises a timer for determining a time period.

4. The portable actuator assembly of claim 3, wherein the actuator assembly is arranged to change from the first configuration to the second configuration when the time period has elapsed.

5. The portable actuator assembly of claim 1, wherein the controller is arranged to at least one of:

move the actuator from a first position in the first configuration to a second position in the second configuration;

shield the actuator in the second configuration and unshield the actuator in the first configuration; and enable the actuator in the first configuration, and disable the actuator in the second configuration.

6. The portable actuator assembly of claim 1, wherein the actuator comprises a tongue which is arranged to extend from the housing when in the first configuration, and to be substantially retracted within the housing when in the second configuration.

7. The portable actuator assembly of claim 1, wherein the actuator comprises a magnet which is arranged to be in a first position, within a detection range of a magnetic switch of said control mechanism of said safety switch, when in the first configuration, and to be moveable within the housing to a second position, outside of a detection range of a magnetic switch of said control mechanism of said safety switch, when in the second configuration.

8. The portable actuator assembly of claim 1, wherein the actuator comprises a transmitter which is arranged to be in a first position, within a detection range of a receiver of said control mechanism of said safety switch, when in the first configuration, and to be moveable within the housing to a second position, outside of a detection range of a receiver of said control mechanism of said safety switch, when in the second configuration.

9. The portable actuator assembly of claim 1, wherein the actuator further comprises at least one of:

a magnet which is arranged to be unshielded when in the first configuration, thereby allowing the magnet to be detected by a magnetic switch of said control mechanism of said safety switch, and shielded when in the second configuration thereby preventing such detection; and a transmitter which is arranged to be unshielded when in the first configuration, thereby allowing a transmission from the transmitter to be received by a receiver of said control mechanism of said safety switch, and shielded when in the second configuration thereby preventing such transmission and/or reception.

10. The portable actuator assembly of claim 1, wherein the actuator comprises a transmitter which is controllable to transmit a signal to a receiver of said control mechanism of said safety switch, when in the first configuration, and to transmit a different signal, or to prevent such transmission, when in the second configuration wherein the transmitter is controllable to be enabled in the first configuration, and disabled in the second configuration.

11. The portable actuator assembly of claim 1 further comprising a driver for at least one of moving the actuator and moving a moveable shield, the moveable shield being at least partially located within the housing, or forming a part of the housing, or being attached to the housing.

12. The portable actuator assembly of claim 1, further comprising a connector for at least one of connecting the controller to at least one of another controller located outside of the actuator assembly and a power supply at least one of partially located within the housing, forming a part of the housing, and being attached to the housing.

13. A method of manipulating an operating condition of a safety switch comprising:

providing a safety switch with at least one set of movable contacts and one set of fixed contacts that interact with one another to provide a conducting state and a non-conducting state;

providing an actuator that interacts with the safety switch to alter an operating condition of the safety switch; and controlling the actuator to limit at least one of a duration or a number of interactions with the safety switch that will allow operational interaction between the actuator and the safety switch.

14. The method of claim 13 wherein controlling the actuator further comprises at least one of extending or retracting the actuator relative to a housing and obstructing a signal communicated between the actuator and the safety switch.

* * * * *